United States Patent [19]

Hirano et al.

[11] Patent Number: 4,679,157
[45] Date of Patent: Jul. 7, 1987

[54] TEMPERATURE MEASURING APPARATUS

[75] Inventors: Masao Hirano, Takatsuki; Motoaki Takaoka, Tsuzuki; Mikihiko Shimura, Otsu, all of Japan

[73] Assignee: Omron Tateisi Electronics Co., Kyoto, Japan

[21] Appl. No.: 650,061

[22] Filed: Sep. 13, 1984

[30] Foreign Application Priority Data

Sep. 14, 1983 [JP] Japan .................. 58-170022

[51] Int. Cl.⁴ .................. G01K 11/00; G01K 11/12; G01K 11/20
[52] U.S. Cl. .................. 364/557; 374/159; 374/161
[58] Field of Search .............. 364/557, 575; 374/159, 374/137, 161, 122, 160; 356/45

[56] References Cited

U.S. PATENT DOCUMENTS

| | | | |
|---|---|---|---|
| 3,015,954 | 1/1962 | Datglish | 364/575 |
| 3,142,755 | 7/1964 | Leroux | 374/159 |
| 3,566,092 | 2/1971 | Grant et al. | 364/575 |
| 4,031,365 | 6/1977 | Raggiotti et al. | 364/375 |
| 4,075,493 | 2/1978 | Wickersheim | 374/159 |
| 4,215,275 | 7/1980 | Wickersheim | 374/159 |
| 4,223,226 | 9/1980 | Quick et al. | 374/130 |
| 4,245,507 | 1/1981 | Samulski | 374/122 |
| 4,298,947 | 11/1981 | Tamura et al. | 364/575 |
| 4,376,890 | 3/1983 | Engstrom et al. | 374/130 |
| 4,411,519 | 10/1983 | Tagami | 356/45 |
| 4,419,583 | 12/1983 | Noeller | 250/458.1 |
| 4,437,772 | 3/1984 | Samulski | 374/159 |
| 4,448,547 | 3/1984 | Wickersheim | 374/159 |
| 4,455,741 | 6/1984 | Kolodner | 374/161 |
| 4,459,044 | 7/1984 | Alves | 374/159 |
| 4,558,217 | 12/1985 | Alves | 374/161 |

*Primary Examiner*—Errol A. Krass
*Assistant Examiner*—Danielle Laibowitz
*Attorney, Agent, or Firm*—Stevens, Davis, Miller & Mosher

[57] ABSTRACT

A temperature measuring apparatus utilizing the temperature dependence of the characteristics of fluorescence and afterglow emitted from a fluorescent substance by exciting the substance. The fluorescence and afterglow emitted by the excited fluorescent substance are detected and converted to electric signals. The fluorescence signal and afterglow signal are integrated for a predetermined period of time to obtain an integral amount of light. The temperature is determined by comparing the integral amount of light with the temperature characteristics of an integral amount of light preset for the fluorescent substance.

9 Claims, 9 Drawing Figures

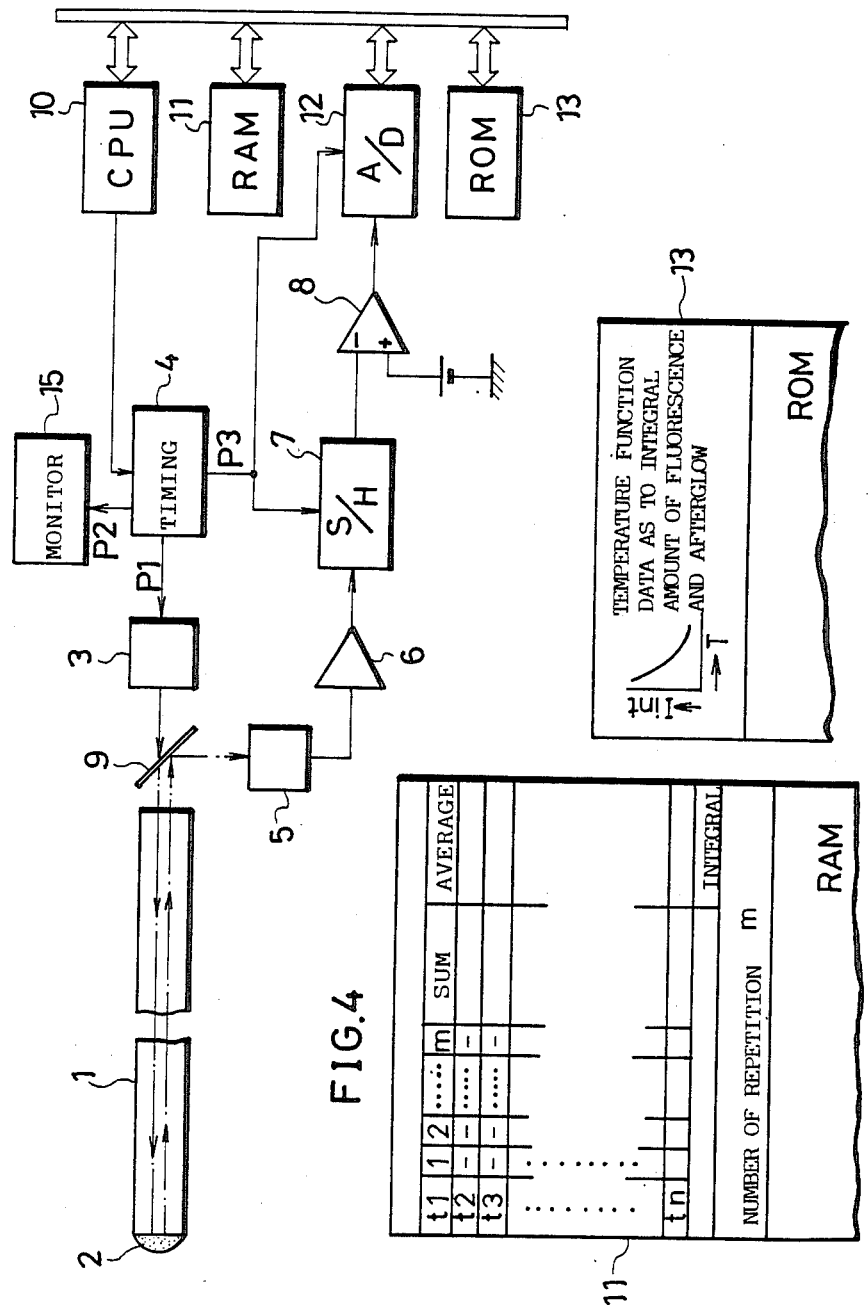

TIMING PULSE P1

FLUORESCENCE
AND AFTERGLOW

SAMPLING PULSE P3

TEMPERATURE MEASURING APPARATUS

BACKGROUND OF THE INVENTION

The present invention relates to an apparatus for measuring temperature by light with use of a fluorescent substance.

The terms "fluorescence" and "fluorescent substance" are used in this specification and the appended claims as including "phosphorescence" and "phosphorescent substances". Further, as to the luminescence of the fluorescent substance, luminescence during exciting is termed fluorescence, as distinguished from afterglow which means luminescence after the cessation of excitation.

Methods of measuring temperatures with use of light, wherein no electric signals are used, have the feature of being totally free of the infuence of noise due to electromagnetic fields, and various apparatus incorporating optical fibers have been developed for such methods. Above all, temperature measurement by making use of the luminescence of a fluorescent substance has the advantage that because the wavelength of the light for exciting the fluorescent substance differs from that of the light emitted by the substance, the output light from the measuring system can be separated from the input light thereto, that is, the fluorescence and afterglow of the fluorescent substance can be separated according to wavelength. It is therefore possible to transmit input and output light with a single optical fiber and to use a compact light transmission system.

The techniques for measuring temperatures using fluorescent substances are divided generally into those making use of the temperature dependence of the intensity of fluorescence during exciting, and those resorting to the temperature dependence of the duration of afterglow after the cessation of exciting. Any of the conventional temperature measuring techniques utilizes fluorescence or afterglow unused for and irrelevant to the measurement of temperature with respect to a time series. In addition to this common drawback, the conventional techniques for measuring temperature with use of fluorescence or afterflow have the following problems.

In measuring temperature by utilizing the variation in the intensity of fluorescence with temperature, exciting light of high intensity and fluorescence of low intensity are present at the same time, so that the two kinds of light must be spectrally or otherwise separated according to the wavelength. This requires an optical system and involves the drawback that it is difficult to provide measurements with a high S/N ratio.

On the other hand, in measuring temperature by making use of the variation in the intensity of afterglow with temperature, afterglow, which is the light emitted after the cessation of exciting, is detected. Accordingly this measuring method has the advantage that the exciting light exerts no influence on the measurement of afterglow in principle, permitting easy optical measurement. To determine the duration of afterflow, it is general practice to measure the period of time from the cessation of exciting or from the time when the intensity of afterglow decreases to 90% of the intensity at the time of cessation of exciting (i.e. peak intensity) to the time when the intensity decreases to 10% of the peak intensity. Since which points on the afterglow curve correspond to these measuring time points becomes apparent after the completion of the measuring procedure, all the signal components forming the afterglow curve are to be covered by a measuring process. Consequently the method has the drawback that the accuracy of measurement is subject to the influence of an unexpected or partial signal variation which could occur during the measuring process due to noise or the like. The method has another problem. To determine the duration of afterglow, the intensity of afterglow must be measured during the decay of afterglow, whereas it is difficult to measure low intensities of afterglow and therefore to determine the point in time when the afterglow intensity becomes zero without error. Thus it is impossible to accurately determine the duration of afterglow. Stated more specifically, the intensity of afterglow decreases as an exponential or hyperbolic function, and the variation of intensity of afterglow is very small where the intensity is very low. Accordingly the determination of the point in time when the afterglow intensity decreases to 10% of the peak value invariably involves a large error factor.

SUMMARY OF THE INVENTION

The main object of the present invention is to provide an apparatus for measuring temperature employing a fluorescent substance by measuring both the fluorescence and afterglow of the substance to thereby effectively utilize the duration of luminescence of the substance and assure accurate temperature measurement free of the drawbacks of the conventional method of determining the duration of afterglow.

The temperature measuring apparatus of the present invention is characterized in that the apparatus comprises a fluorescent substance whose fluorescence characteristics and afterglow characteristics have temperature dependence and which is to be provided in an atmosphere or on an object the temperature of which is to be measured, means for exciting the fluorescent substance, light receiving means for detecting light (fluorescence and afterglow) emitted by the fluorescent substance when the substance is excited, integration means for integrating signals of received fluorescence and afterglow for a predetermined period of time to determine an integral amount of light, and means for calculating the temperature by comparing the resulting integral amount of light with the temperature characteristics of integral amount of light predetermined for the fluorescent substance.

Most simply, an integration circuit can be used as the integration means which circuit is adapted to directly integrate the fluorescence signal and the afterglow signal in analog fashion. For digital processing, the fluorescence signal and the afterglow signal are sampled at a suitable time interval, followed by a-d conversion to obtain sampling data, which is stored in a memory, and the stored sampling data is added. Such operation and process are controlled, for example, by a central processing unit (hereinafter referred to as "CPU"), preferably by a microprocessor. It is also possible to use as the integration means a means comprising a V/F conversion circuit for converting the received fluorescence signal and afterglow signal to pulses having a frequency in accordance with the magnitude thereof and counter means for counting up the output pulses from the V/F conversion circuit for the predetermined period of time. A counter or microprocessor will be used as this means.

The period of time for integration can be an optional period of time during which fluorescence and afterglow are emitted. As will be described later, the time period may be predetermined or fixed, or the fluorescence and afterglow signals may be discriminated at a specified level to determine the time period.

The fluorescence can be distinguished from the exciting light by a light receiving element having such spectral sensitivity characteristics that it is insensitive to the exciting light, or by a filter disposed in front of the light receiving means for blocking the exciting light, whereby the fluorescence only is made available efficiently.

When an infrared-visible light conversion fluorescent substance is used as the fluorescent substance, an infrared light-emitting diode can be used as the exciting light source. This permits pulse drive with ease.

Generally, the lower the temperature, the higher is the intensity of fluorescence of the fluorescent substance. The intensity of afterglow also has exactly the same temperature characteristics. According to the invention, both fluorescence and afterglow are measured to determine an integral amount of light, so that the measurement varies more greatly with temperature than when only one kind of light is measured. This results in measurement of higher accuracy. Further since the integral amount of light is determined over a predetermined period of time, the present apparatus is less susceptible to the influence of an unexpected or partial variation of signal than the conventional apparatus for determining the duration of afterglow. Moreover, there is no need for discriminating low-intensity signals as to a certain level. These advantages assure temperature measurement with improved accuracy.

The advantage resulting from the measurement of an integral amount of light can be explained quantitatively as stated below. For a simplified explanation, afterglow only will be discussed.

When it is assumed that the afterglow decreases as an exponential function, the afterglow characteristics are represented by the following equation:

$$I(t) = A \cdot Io(T) \cdot \exp(-t/\tau(T)) \quad (1)$$

where T is temperature, t is the time measured from the time point of cessation of exciting, I(t) is the intensity of afterglow at the time t, Io(T) is the intensity of afterglow at the time point of cessation of exciting (t=0), $\tau(T)$ is the average life of excited state of the fluorescent substance, and A is a proportionality constant. Of these parameters, Io(T) and $\tau(T)$ vary with temperature T. The variation of $\tau(T)$ due to temperature appears as a variation in the duration of afterglow due to temperature. The variation of Io(T) due to temperature appears as a variation in the fluorescence (peak) intensity.

Suppose the duration of afterglow td is the period of time taken for the intensity of afterglow to reduce to 10% from the time point of cessation of the excitation. The duration td is then given by the following equation.

$$td = -\tau(T) \cdot \ln(0.1/A). \quad (2)$$

Equation (2) shows that even if the variation of Io(T) due to temperature is great, the variation of the duration of afterglow td due to temperature is small when the variation of $\tau(T)$ due to temperature is small.

On the other hand, the integral value Iint(T) of afterglow intensity is given by the following equation.

$$Iint(T) = \int_{t1}^{t2} I(t) dt \quad (3)$$

$$= A \cdot Io(T) \int_{t1}^{t2} \exp\left(-\frac{t}{\tau(T)}\right) dt$$

where t1 and t2 are the start point and end point, respectively, of the integration time period. Equation (3) indicates that even when the variation of $\tau(T)$ due to temperature is small, the integral value Iint(T) varies greatly with the variation of Io(T) due to temperature.

Since the variation of the peak intensity Io(T) with temperature is the most general property of fluorescent substances, a fluorescent substance having the desired temperature-denpent luminescence intensity can be easily selected from a wide variety of substances for use in this invention.

According to the invention, various fluorescent substances can be used insofar as they have fluorescence characteristics and afterglow characteristics which are dependent on temperature. Desirable fluorescent substances are those having an afterglow duration of about $10^{-6}$ to $10^{-3}$ second. Examples of useful fluorescent substances which are excitable with ultraviolet light are rare earth metal oxysulfides such as $Y_2O_2Si:Eu$, other sulfides such as ZnS:Ln (zinc sulfide, Ln standing generally for rare earth elements) and SrS:Ln (strontium sulfide), and fluorescent substances for CRT's. Examples of useful fluorescent substances which are excitable with infrared light are those emitting visible light, consisting basically of a rare earth fluoride or rare earth oxyfluoride and further containing ytterbium or erbium, such as $Ln:F_3:(Yb, Er)$ and LnOF:(Yb, Er), and those emitting infrared light and consisting basically of lithium neodymium phosphate, such as $LiNdP_3O_{12}:Yb$.

Such infrared-visible light conversion fluorescent substances are excitable by Si-doped GaAs light-emitting diodes, and $LiNdP_3O_{12}:Yb$ by AlGaAs light-emitting diodes.

BRIEF DESCRIPTION OF THE DRAWINGS

FIG. 3 is a block diagram showing an embodiment of the invention;

FIG. 4 shows some contents of a RAM and a ROM;

DESCRIPTION OF THE PREFERRED EMBODIMENTS

The present invention will be described below in greater detail with reference to the accompanying drawings.

Figure 1:
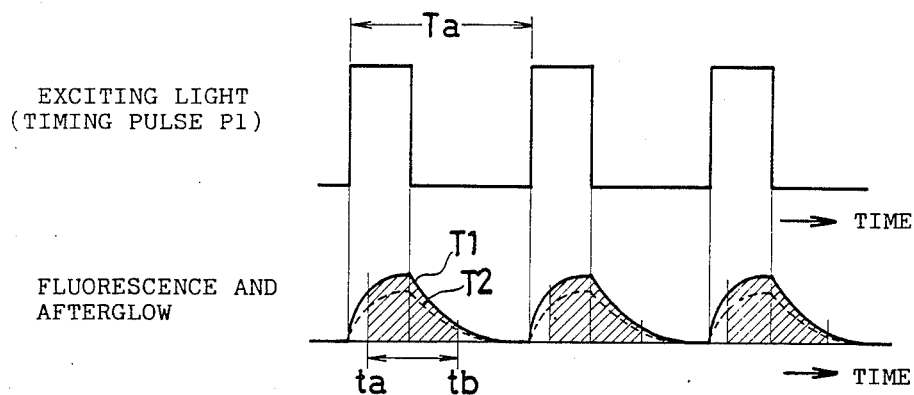
FIG. 1 is a waveform diagram showing exciting light, and fluorescence and afterglow emitted from a fluorescent substance.

FIG. 1 shows the pulse or rectangular waveform of exciting light and that of light emitted by a fluorescent substance excited by the light, further indicating that the waveform of the emitted light from the fluorescent substance differs at different temperatures. The light emitted during excitation is fluorescence, and the light emitted after the cessation of excitation and decaying with time is afterglow. Of the fluorescence and afterglow waveforms shown, those at a temperature T1 are indicated in solid lines, and those at a temperature T2 in broken lines. T1 is lower than T2. Generally there is a tendency for the intensity of luminescence to increase with decreasing temperature. An optional period of time, ta to tb, during which fluorescence and afterglow are emitted is an integration time period. The area of the hatched portion is an integral amount of light (at the temperature T1).

Figure 2:
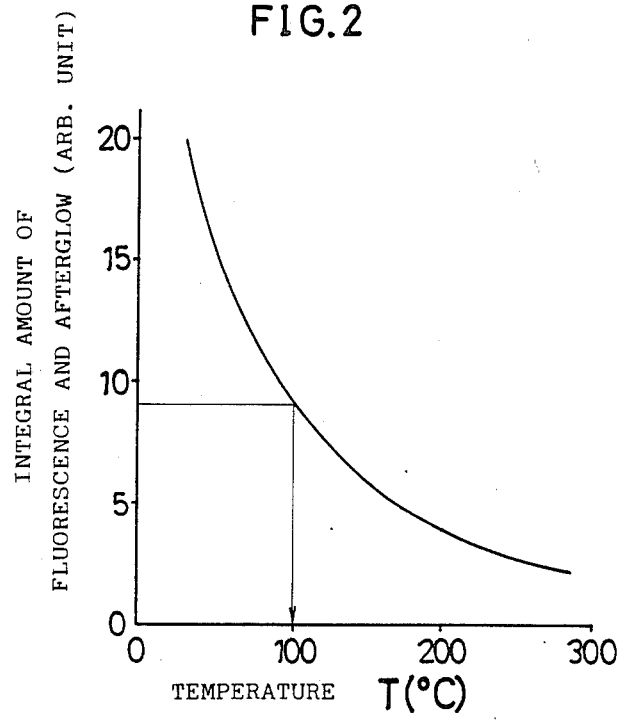
FIG. 2 is a graph showing the temperature characteristics of an integral amount of fluorescence and afterglow.

FIG. 2 shows the temperature characteristics of the integral amount of fluorescence and afterglow. The integral amount of light emitted by the fluorescent substance to be used is previously measured at varying temperatures T, and the characteristics are represented by a known function as seen in FIG. 2. A particular integral amount of light measured is compared with the temperature characteristics to determine the temperature. The integration time period for determining the characteristics of FIG. 2 matches the integration time period for the temperature measuring apparatus wherein the characteristics are used.

Figure 5:
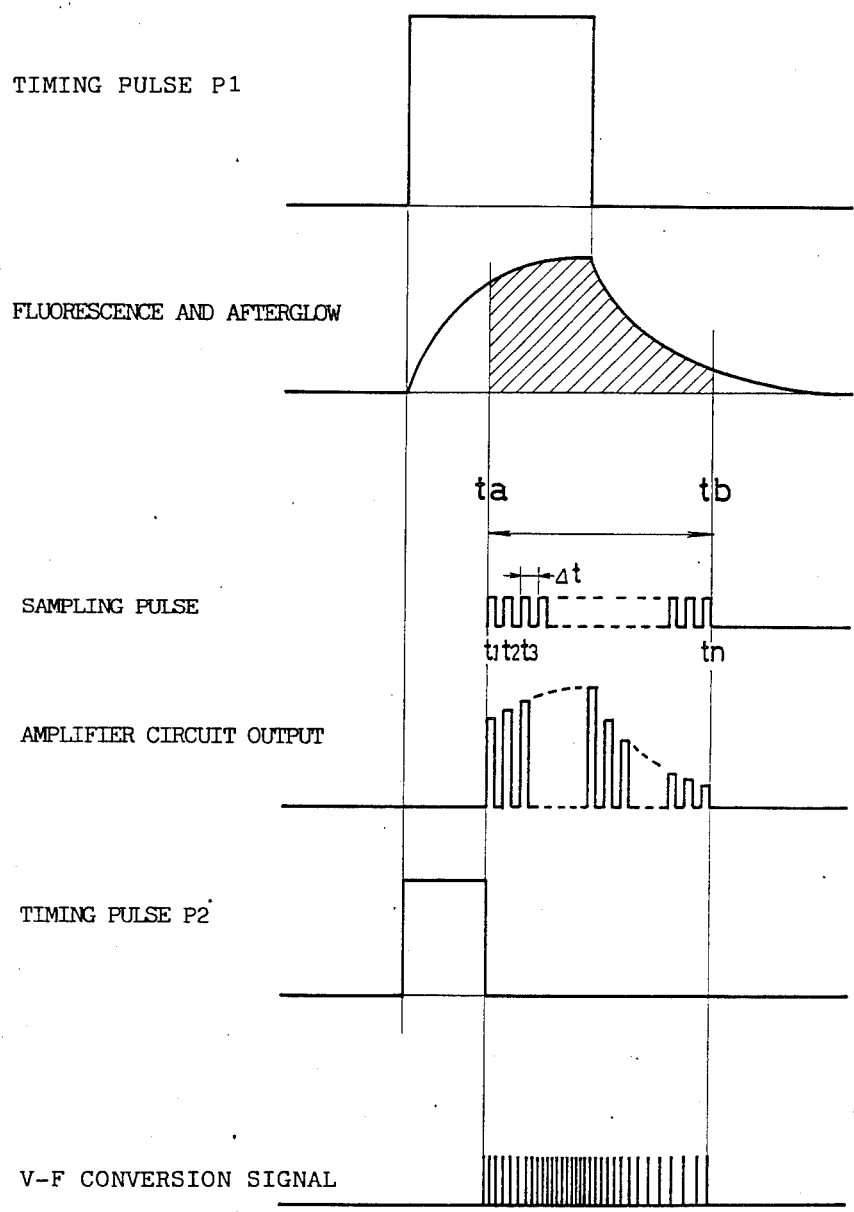
FIG. 5 is a time chart showing the operation of the circuit shown in FIG. 3.

FIG. 3 shows the construction of a temperature measuring apparatus, and FIG. 5 shows the operation thereof. A desired fluorescent substance 2 is attached to the forward end of an optical fiber 1 to provide a temperature probe. The forward end of the temperature probe is disposed exposed to the atmosphere or held in contact with the object whose temperture is to be measured. Three kinds of timing pulse signals P1, P2 and P3 are produced from a timing circuit 4 under the control of a CPU 10. Pulses P1, which are adapted to drive a light emitter 3, are produced at a predetermined period Ta (see FIG. 1). The period Ta is so determined that it is sufficient for the afterglow from the fluorescent substance 2 to completely disappear at any temperature within the measuring range contemplated. Upon receiving the pulse P1, the emitter 3 produces exciting light, which impinges on the substance 2 through the optical fiber 1. The fluorescence emitted from the fluorescent substance 2 thus excited and the afterglow thereof propagate through the optical fiber 1 and are delivered to a light receiver 5 by a beam splitter 9. The detecting signal of the receiver 5 is amplified by a preamplifier 6 and then fed to a sample holding circuit 7. The light receiver 5 is one having such spectral sensitivity characteristics that it detects the fluorescence and afterglow only but does not detect the exciting light. Alternatively, the receiver 5 is provided in front thereof with a filter for blocking the exciting light but passing the fluorescence and afterglow only.

The exciting light from the light emitter 3 is received also by a light receiving element (not shown) of a light source monitor 15. The exciting light monitoring timing is determined by the pulse P2. The pulse P2 rises simultaneously with the rise of the pulse P1 and falls before the fall of the pulse P1 (see FIG. 5). The intensity of the exciting light is detected when the pulse P2 is produced, and the emitter 3 is controlled to render the exciting light intensity constant at all times, based on the detecting signal (the control circuit is not shown).

Timing pulses (sampling pulses) P3, n in number, are produced from the timing circuit 4 during the integration time period ta to tb as shown in FIG. 5. The time points these pulses P3 are produced are indicated at t0, t1, t2, ..., tn. The period of pulses P3 is $\Delta t$. The period $\Delta t$ is so determined that it is slightly longer than the a-d conversion operating time of an analog-digital (A/D) converter 12. While the integration time period ta to tb can be set optionally, the start point ta of the period is set at the falling time point of the exciting light monitoring pulse P2 according to the present embodiment. The end point tb of the integration time period is limited by the afterglow level at the upper limit temperature of the measuring temperature range where the luminescence of the fluorescent substance is lowest in intensity. For example, the end point tb is the time point when the afterglow level at the upper limit temperature decreases to about 30% of the peak intensity (intensity at the time point of cessation of the excitation). In practice, it is desirable to set the start point ta during the period of fluorescence and the end point tb during the period of afterglow as seen in FIG. 5. However, the integration period may be divided into a plurality of sections, such that one or more of the sections may be set as a fluorescence time period and that one or more of the other sections may be set as an afterglow time period.

When the operating time of A/D converter 12 is short, the integration time period can be set to a relatively short period. For example, the start point ta can be slightly before the time point of cessation of excitation, and the end point tb can be set to the time when the afterglow level decreases to 90% of the peak intensity. Measurement with sufficiently high accuracy can be achieved also in this case. The short integration time period assures high-speed temperature measurement. Even when a fluorescent substance is used which is relatively long in the duration of afterglow, the proportion of the integration time period in the duration of afterglow can be made smaller. The longer the integration time period, the better is the reproducibility, but it is desirable to determine the period according to assignment of time for the data processing by the CPU 10.

The timing pulses P3 are sent to the sample holding circuit 7 and the A/D converter 12. The signals representing the light detected by the receiver 5 and obtained only during the integration time period have their levels held in the circuit 7 for the pulses P3 individually. The output of the circuit 7 is amplified by an amplifier circuit 8 and then fed to the A/D circuit 12, in which it is converted to a digital signal during the time interval $\Delta t$. The signal is stored in a RAM 11.

With reference to FIG. 4, the RAM 11 has an area for storing the a-d converted sampling data and an area for storing the number repetitions, m, of pulses P1. According to the present embodiment, the fluorescent substance 2 is excited repeatedly m times, and an integral amount of light is calculated from the averages of sums of sampling data at the respective time points. The sampling data area includes locations for storing the sampling data resulting from the first to mth excitations for each of the sampling time points t0 to tn, the sum and average of m pieces of data, and the eventual integral value. A ROM 13 has stored therein, for example, in the form of a table the temperature characteristics of the integral amount of fluorescence and afterglow shown in FIG. 2.

The integral amount of fluorescence and afterglow, which is determined by the foregoing procedure including sampling and a-d conversion, may alternatively be determined by subjecting the voltage output of the light receiver 5 to V-F conversion during the integration time period ta to tb to obtain pulses of frequency according to the output (shown as V-F converted signal in FIG. 5) and counting up the pulses. The count of course represents the integral amount of light.

Figure 6:
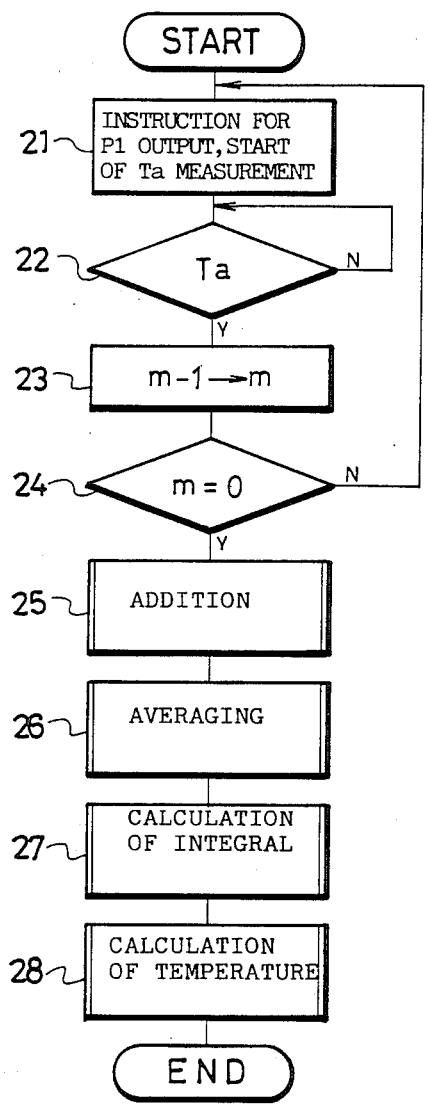
FIGS. 6 and 7 are flow charts showing the operation of a CPU.

The temperature measuring apparatus shown in FIG. 3 is controlled by the CPU 10. FIG. 6 shows the control and temperature calculating process by the CPU 10. First, the CPU 10 gives an instruction to the timing circuit 4 for producing a pulse P1, while a timer within the CPU 10 starts measuring the period Ta (step 21), whereupon pulses P1 and P2 are emitted from the circuit 4. The circuit 4 further starts producing pulses P3 at the time point when the pulse P2 falls. The CPU 10 waits until the time Ta elapses (step 22).

In the meantime, the fluorescent substance 2 is excited as stated above, and the fluorescence and afterglow emitted from the substance 2 are thereafter sampled every time the pulse P3 is given. The data is a-d converted and thereafter stored in the RAM 11 at every sampling time point at the location corresponding to the repetition number. When the time Ta measured by the timer is up, 1 is subtracted from the repetition number m within the RAM 11 (step 23). Step 24 checks whether the result is 0. Unless m=0, step 21 follows again to similarly repeat the excitation of the fluorescent substance and sampling of luminescence signals.

When the luminescence is completely measured m times, the m pieces of sampling data in the RAM 11 are added for each sampling time point (step 25), and the average of the m pieces of data is calculated (step 26). All the average values for the sampling time points are then added to obtain an eventual integral value (step 27). The integral value eventually obtained is compared with the temperature function of fluorescence and afterglow to calculate the temperature T (step 28). Although an average is calculated for each sampling time point in step 26, this step may be omitted, and the sums for the sampling time points are added to obtain the integral thereof, from which the temperature is determined. The result will be the same as above.

Figure 8:
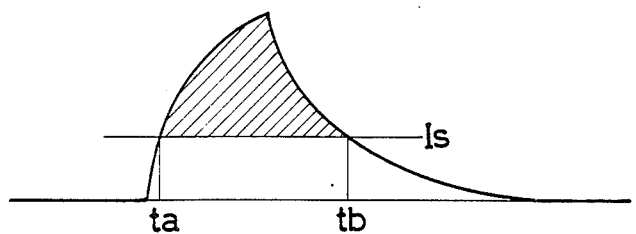
FIG. 8 is a waveform diagram showing how to determine the end point of an integration time period according to an afterglow level.

Although the start point ta and the end point tb of the integration time period are predetermined or fixed beforehand, these points may be determined according to the signal level of received light. Stated more specifically with reference to FIG. 8, an intensity level IS is predetermined and stored in the RAM 11 for the determination of start point ta and end point tb. The time point when the received light signal exceeds the level IS is taken as the start point ta, and the time point when the signal becomes lower than the level IS is taken as the time point tb. In this case, sampling pulses P3 are continuously emitted at all times, and the received light signal is sampled for the entire waveform.

Figure 7:
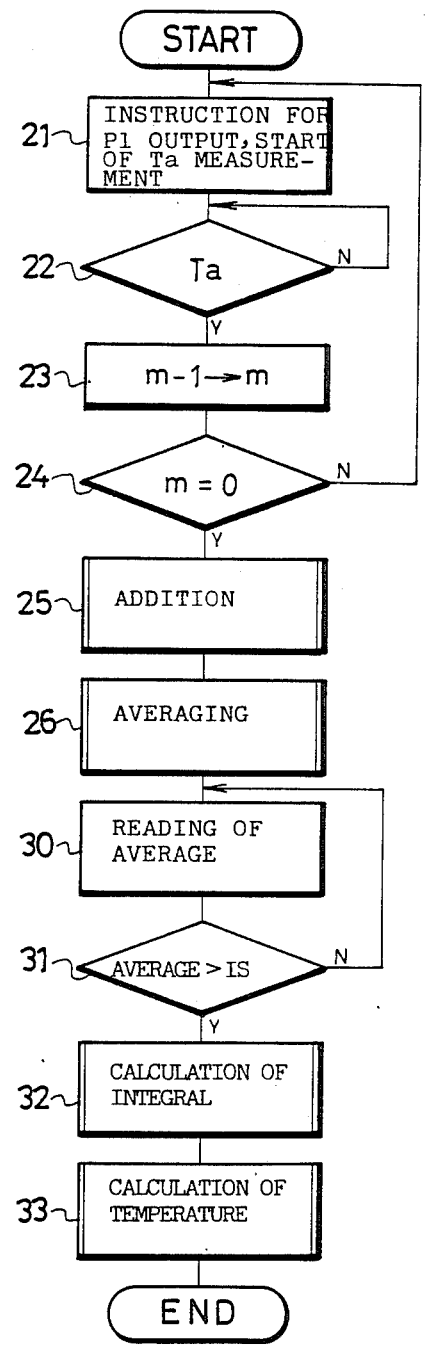

FIG. 7 shows the process to be performed by the CPU when the start and end points are determined by the above method. Steps 21 to 25 are exactly the same as those shown in FIG. 6. When an average is calculated for each sampling point, the average value is read out (step 30) and compared with the level IS (step 31). The average values which are greater than the level IS are added to obtain an integral value (step 32), which is then compared with the temperature function of integral amount of light to determine the temperature T (step 33).

Figure 9:
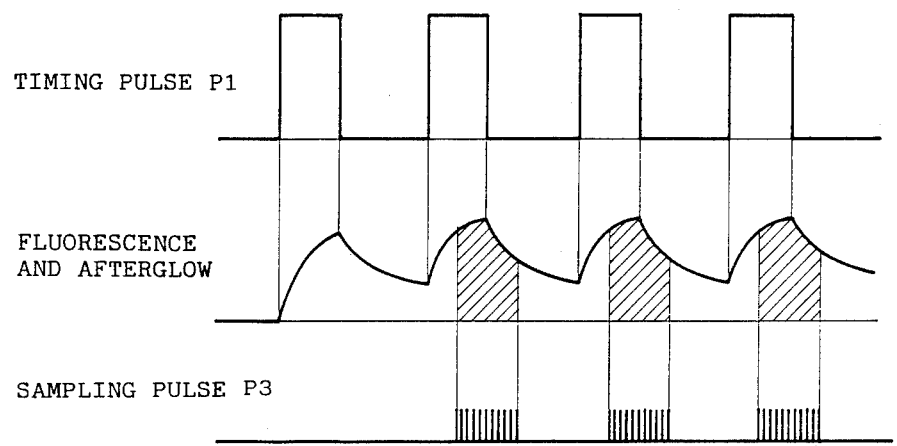
FIG. 9 is a time chart showing another mode of excitation.

Although the exciting period Ta for the fluorescent substance is so determined as to be sufficient for the afterglow to completely disappear according to the foregoing description, the period Ta may be shorted. As shown in FIG. 9, the next pulse P1 is emitted to excite the fluorescent substance while the current afterglow is still present to measure the temperature with use of a dynamic luminescence response. In this case, the first luminescence, which differs from the following luminescence, is not utilized for the measurement of temperature. This method assures expedited temperature measurement.

What is claimed is:

1. A temperature measuring apparatus comprising: a fluorescent substance whose fluorescence characteristics and afterglow characteristics have a known temperature dependence, means for exciting the fluorescent substance, light receiving means for detecting the light emitted by the fluorescent substance when the substance is excited, integration means for integrating signals of received fluorescence and afterglow for a predetermined period of time to provide an output representing an integral amount of light, and means for calculating a temperature of said fluorescent substance by comparing said output representing said integral amount of light with predetermined data representing integral amounts of light emitted by said fluorescent substance when excited at varying temperatures.

2. An apparatus as defined in claim 1 wherein the integration means stores in a memory the data obtained by sampling the fluorescence and the afterglow at a specified time interval and adds the stored sampling data.

3. An apparatus as defined in claim 1 wherein the integration means is an integration circuit.

4. An apparatus as defined in claim 1 wherein the integration means comprises a V/F conversion circuit for converting the signals of received fluorescence and afterglow into pulses of frequency in accordance with the magnitude of the signals, and counter means for counting up the output pulses form the V/F conversion circuit for the predetermined period of time.

5. An apparatus as defined in claim 1 wherein the start point and the end point of the integration time period are predetermined.

6. An apparatus as defined in claim 1 wherein the integral amount of light is determined for a plurality of periods of time during the emission of fluorescence and afterglow by said fluorescent substance.

7. An apparatus as defined in claim 1 wherein the end point of the integration time period is determined based on the peak intensity of luminescence of the fluorescent substance at the upper limit of measuring temperature range.

8. An apparatus as defined in claim 1 wherein the start point and the end point of the integration time period are the time points when the fluorescence signal and the afterglow signal respectively reach a predetermined intensity level.

9. An apparatus as defined in claim 1 wherein the fluorescent substance is excited a plurality of times, and the temperature is calculated from the average value of integral amounts of fluorescence and afterglow resulting from the plurality of times of excitation.

* * * * *